United States Patent
Adam et al.

(10) Patent No.: US 9,652,814 B2
(45) Date of Patent: May 16, 2017

(54) METHOD AND APPARATUS FOR GENERATING AND AUTHENTICATING SECURITY DOCUMENTS

(75) Inventors: Bence Adam, Budapest (HU); Kalman Manhercz, Pilisvorosvar (HU); Ferenc Takacs, Budapest (HU)

(73) Assignee: Jura Trade, Limited, Budapest (HU)

( * ) Notice: Subject to any disclaimer, the term of this patent is extended or adjusted under 35 U.S.C. 154(b) by 175 days.

(21) Appl. No.: 14/006,123

(22) PCT Filed: Mar. 27, 2012

(86) PCT No.: PCT/IB2012/000622
§ 371 (c)(1),
(2), (4) Date: Sep. 19, 2013

(87) PCT Pub. No.: WO2012/131474
PCT Pub. Date: Oct. 4, 2012

(65) Prior Publication Data
US 2014/0010403 A1    Jan. 9, 2014

Related U.S. Application Data

(60) Provisional application No. 61/468,762, filed on Mar. 29, 2011.

(51) Int. Cl.
*G06T 1/00* (2006.01)
*G07D 7/20* (2016.01)
(Continued)

(52) U.S. Cl.
CPC ............ *G06T 1/0021* (2013.01); *B42D 25/00* (2014.10); *G06T 1/005* (2013.01); *G07D 7/2025* (2013.01);
(Continued)

(58) Field of Classification Search
None
See application file for complete search history.

(56) References Cited

U.S. PATENT DOCUMENTS 4,557,596 A * 12/1985 Mueller et al. .......... B41M 3/14
283/94
5,178,418 A * 1/1993 Merry ...................... B41M 3/14
283/73
(Continued)

FOREIGN PATENT DOCUMENTS

CN   WO 2015024257 A1 *  2/2015  ........... G06T 7/0081
DE       102006029798 A1      1/2008
(Continued)

OTHER PUBLICATIONS

International Preliminary Report on Patentability for PCT/IB2012/000622 dated Oct. 1, 2013.
(Continued)

*Primary Examiner* — Tsung-Yin Tsai
(74) *Attorney, Agent, or Firm* — RatnerPrestia

(57) ABSTRACT

A method and system for generating a document for use with personal data and an image, including: inputting the personal text data into the processor; inputting the image into the processor; generating, by the processor, a personal identifier based on the personal text data, a first Message Authentication Code (MAC) based on the personal identifier; generating, by the processor, a first wave structure based on the MAC; generating, by the processor, waved microtext based on the wave structure and the personal text data; generating, by the processor, a letter screen image from the input image with the waved microtext; and outputting the letter screen image. A method and system for verification of the generated document is also disclosed.

20 Claims, 9 Drawing Sheets

(51) Int. Cl.
*H04L 9/32* (2006.01)
*B42D 25/00* (2014.01)

(52) U.S. Cl.
CPC .......... *H04L 9/3242* (2013.01); *H04L 9/3247* (2013.01); *H04L 2209/805* (2013.01)

(56) References Cited

U.S. PATENT DOCUMENTS

| | | | | |
|---|---|---|---|---|
| 5,772,249 A * | 6/1998 | Guex | ............ | G07D 7/124 283/93 |
| 6,104,812 A * | 8/2000 | Koltai | ............ | G06T 1/0021 283/113 |
| 6,473,516 B1 * | 10/2002 | Kawaguchi | ............ | G06T 1/0028 382/100 |
| 6,692,030 B1 * | 2/2004 | Phillips | ............ | B41M 3/146 283/114 |
| 8,140,358 B1 * | 3/2012 | Ling | ............ | G06Q 40/08 340/439 |
| 8,340,421 B2 * | 12/2012 | Sullender | ............ | G06K 9/4638 382/173 |
| 8,797,417 B2 * | 8/2014 | Gayko | ............ | G06T 5/005 348/154 |
| 8,861,791 B2 * | 10/2014 | You | ............ | G06K 9/00208 382/104 |
| 2003/0011597 A1 * | 1/2003 | Oizumi | ............ | G06T 5/006 345/427 |
| 2004/0007145 A1 * | 1/2004 | Franz | ............ | B41C 1/04 101/401.1 |
| 2004/0066273 A1 * | 4/2004 | Cortina | ............ | G06K 7/0008 340/5.1 |
| 2004/0247157 A1 * | 12/2004 | Lages | ............ | G06K 9/00805 382/103 |
| 2005/0035590 A1 * | 2/2005 | Jones | ............ | B42D 25/41 283/74 |
| 2005/0100192 A1 * | 5/2005 | Fujimura | ............ | G06K 9/00369 382/103 |
| 2005/0134884 A1 * | 6/2005 | Rombola | ............ | G06K 15/02 358/1.11 |
| 2007/0016790 A1 * | 1/2007 | Brundage | ............ | B42D 25/333 713/176 |
| 2007/0252838 A1 * | 11/2007 | Hains | ............ | G06K 15/02 345/467 |
| 2008/0040004 A1 * | 2/2008 | Breed | ............ | B60R 21/0134 701/45 |
| 2008/0046150 A1 * | 2/2008 | Breed | ............ | B60R 21/0134 701/45 |
| 2008/0101601 A1 | 5/2008 | Ramani et al. | | |
| 2008/0240512 A1 * | 10/2008 | Nireki | ............ | G07D 7/12 382/112 |
| 2009/0020999 A1 * | 1/2009 | Kendrick | ............ | B41M 3/008 283/72 |
| 2009/0021000 A1 * | 1/2009 | McCartney | ............ | B41M 3/008 283/72 |
| 2009/0059304 A1 * | 3/2009 | Manfredi | ............ | B41C 1/05 358/3.06 |
| 2009/0315319 A1 * | 12/2009 | Kendrick | ............ | B44F 7/00 283/93 |
| 2012/0027258 A1 * | 2/2012 | Uchida | ............ | G06K 9/00805 382/103 |
| 2012/0306860 A1 * | 12/2012 | Hatta | ............ | A63F 13/10 345/419 |
| 2013/0314486 A1 * | 11/2013 | Goldau | ............ | B41M 3/14 347/232 |
| 2014/0343842 A1 * | 11/2014 | Ranganathan | ............ | G01C 21/30 701/472 |
| 2015/0165972 A1 * | 6/2015 | Takemae | ............ | G06K 9/00798 348/148 |
| 2015/0165973 A1 * | 6/2015 | Takemae | ............ | G08G 1/167 348/148 |

FOREIGN PATENT DOCUMENTS

| | | | | |
|---|---|---|---|---|
| EP | 1 231 767 A2 | 8/2002 | | |
| EP | 1231767 A2 * | 8/2002 | ............ | G06T 1/005 |
| FR | 2898986 A1 * | 9/2007 | ............ | G01S 17/023 |
| HU | WO 2012131474 A1 * | 10/2012 | ............ | G06T 1/005 |
| WO | WO 2005/010684 A2 | 2/2005 | | |
| WO | WO 2005010684 A2 * | 2/2005 | ............ | G06K 7/1417 |

OTHER PUBLICATIONS

Written Opinion of the International Searching Authority for PCT/IB2012/000622 dated Oct. 1, 2013.
Koltai et al., "Enhanced optical security by using information carrier digital screening," Optical Security and Counterfeit Deterrence Techniques V, edited by Rudolf L. van Renesse, Proc. of SPIE-IS&T Electronic Imaging, SPIE vol. 5310, 2004, pp. 160-169.
International Search Report for PCT/IB2012/000622 mailed Jul. 11, 2012.
Patent Examination Report No. 1 issued in Australian Patent Application No. 2012235850 dated Dec. 11, 2015.
First Office Action issued in Indonesian Patent Application No. W00 2013 04942 dated Nov. 10, 2015.
European Examination Report for European Application No. 12717837.4, dated Jan. 27, 2017, 8 pages.
EAPO Notification issued in Application No. 201391405 mailed Aug. 27, 2015.
Patent Examination Report No. 2 issued in Australian Patent Application No. 2012235850 dated Nov. 28, 2016 (3 pages).

* cited by examiner

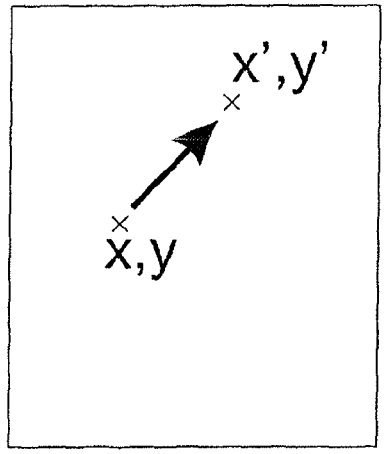
FIG. 3A.  FIG. 3B
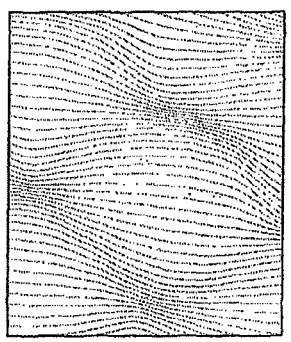
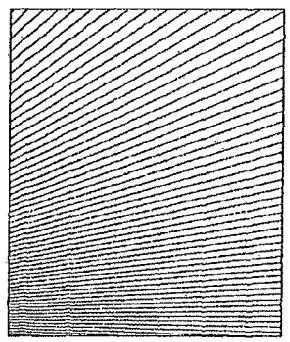
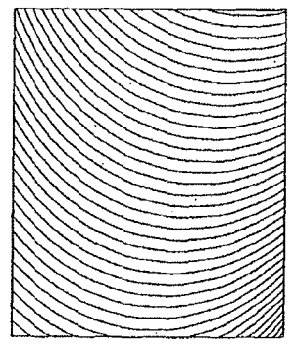
FIG. 4A.  FIG. 4B  FIG. 4C

METHOD AND APPARATUS FOR GENERATING AND AUTHENTICATING SECURITY DOCUMENTS

CROSS REFERENCE TO RELATED APPLICATIONS

This application is the U.S. National Phase Application of PCT/IB2012/000622, filed Mar. 27, 2012, which claims priority to U.S. Provisional Application No. 61/468,762, filed Mar. 29, 2011, the contents of such applications being incorporated by reference herein.

BACKGROUND OF THE INVENTION

The inventors' original LetterScreen (LS) system (illustrated in FIG. 1) has been an attractive feature for first-level verification of high security documents, such as passports. In the LS system, as applied to a passport, a portrait of the passport applicant was built up from lines of microtext. The microtext 101 was personalized; to include the applicant's name, document number and/or other personal data. The personalized text lines fill the entire image. There were slight differences in character size and thickness to clearly show the portrait. LetterScreen was the optimal ghost image, and enhanced security because it directly linked the portrait to the owner & document itself. The first generation of LetterScreen was printed along straight horizontal lines.

The second generation of LS was enhanced by using a slight wave in the text lines. The second generation of LS was even more difficult to reproduce than the first generation LS.

The verification of both original LS and second generation of LS was based on the comparison of text in the LetterScreen and the readable personal data, as well as data on the screen, when OCR lines were read. The verification of the document containing the letter screen required the use of a special magnifier. As such, verification was a slow tedious process.

SUMMARY OF THE INVENTION

In view of the inefficiencies of the original LS system and process, the inventors have devised further enhancements that provide enhanced security as well as automated high speed verification of the subject document. Among the enhancements are the use of a unique microtext wave in each document. Each image created utilizing this enhanced system and method is created with a unique wave-structure, created with an algorithm based on the personal data from the (MRZ) of the document.

To determine authenticity of a subject document, the inventors' Verification Module re-generates the required waves (based on the MRZ) and matches this wave with the structure scanned by a document reader, such as a full-page passport reader. If it is determined that the two waves match: an output, such as a green light, advises the operator that the document is authentic. On the other hand, if the two waves do not match an output, such as a red light, advises the operator that the document has been forged or manipulated.

BRIEF DESCRIPTION OF THE DRAWINGS

FIGS. 3A-B illustrate the transformation of the microtext structure. FIGS. 4A-B-C illustrate sinus and other transformation functions.

DETAILED DESCRIPTION OF THE INVENTION

Figures 1, 2:
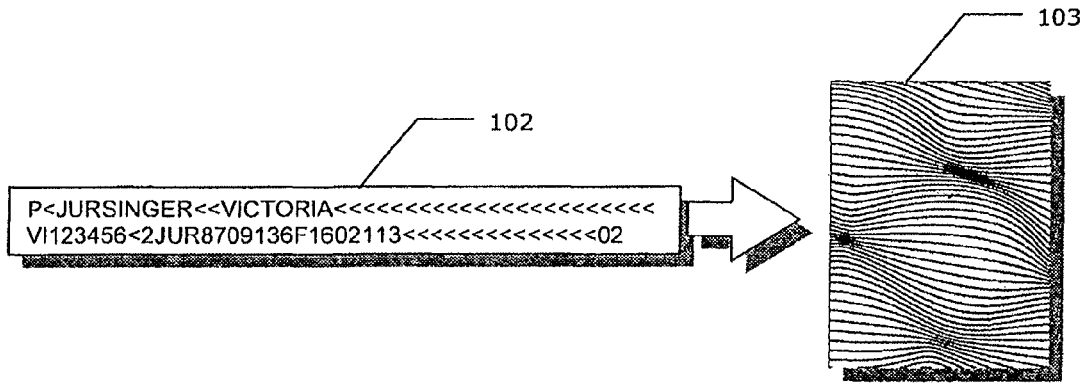
FIG. 1 is a conventional LetterScreen image.
FIG. 2 is an illustration of a LetterScreen++ (waved LetterScreen) generated from unique personal data in accordance with an exemplary embodiment of the present invention.
Figure 5A:
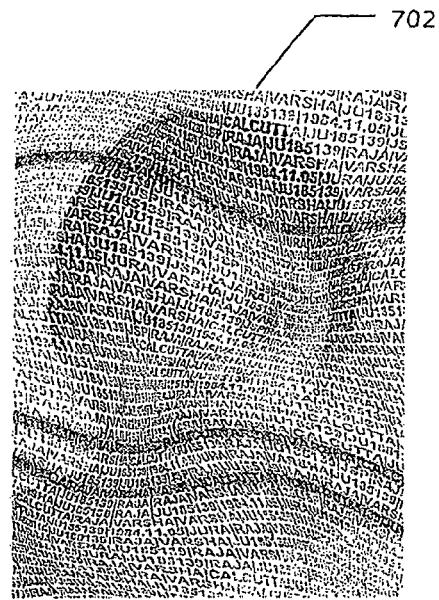
FIGS. 5A-B illustrate differences between images generated using different personal data.
Figure 5B:
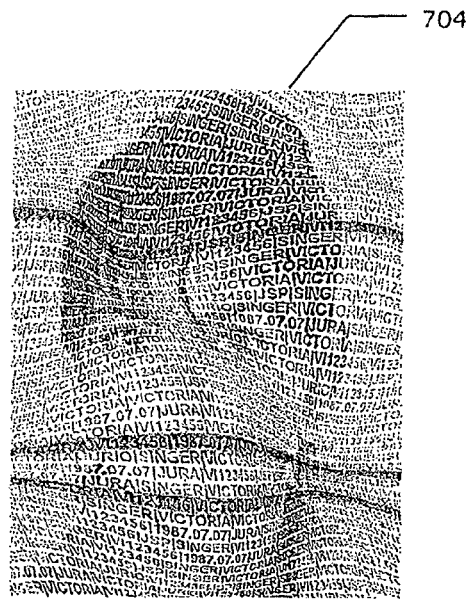

FIG. 2 is an illustration of a LetterScreen 110 in accordance with an aspect of the present invention generated from unique personal data 102. Details are discussed below with respect to FIG. 7. FIGS. 5A-B illustrate differences between images 702, 704 generated using different personal data. Certain of the wavy lines are highlighted to show these differences.

Figure 6A:
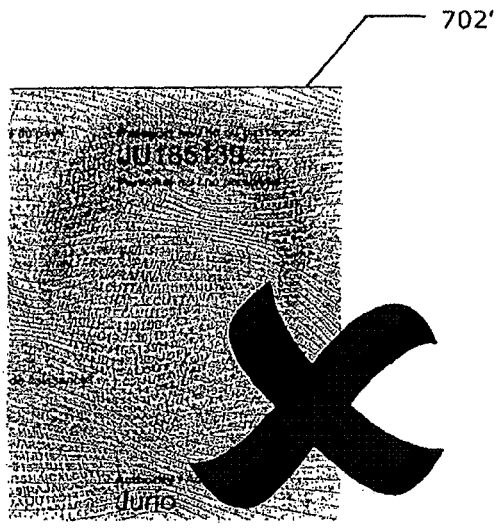
FIGS. 6A-B illustrate verification or rejection of scanned images.
Figure 6B:
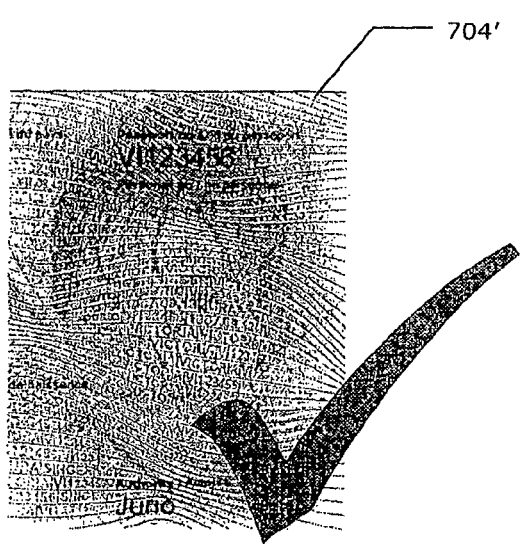

In FIGS. 6A-B verification or rejection of scanned images is illustrated. In FIG. 6A-B, images purporting to be authentic are scanned and processed in accordance with an exemplary embodiment of the present invention. After each image is scanned the wavy line portion is compared with a newly generated wavy line pattern created based on the unique personal image data. In this example image 704' is determined to be authentic whereas image 702' is found to be a fake. Details of the verification process are discussed below with respect to FIG. 8.

Figure 7:
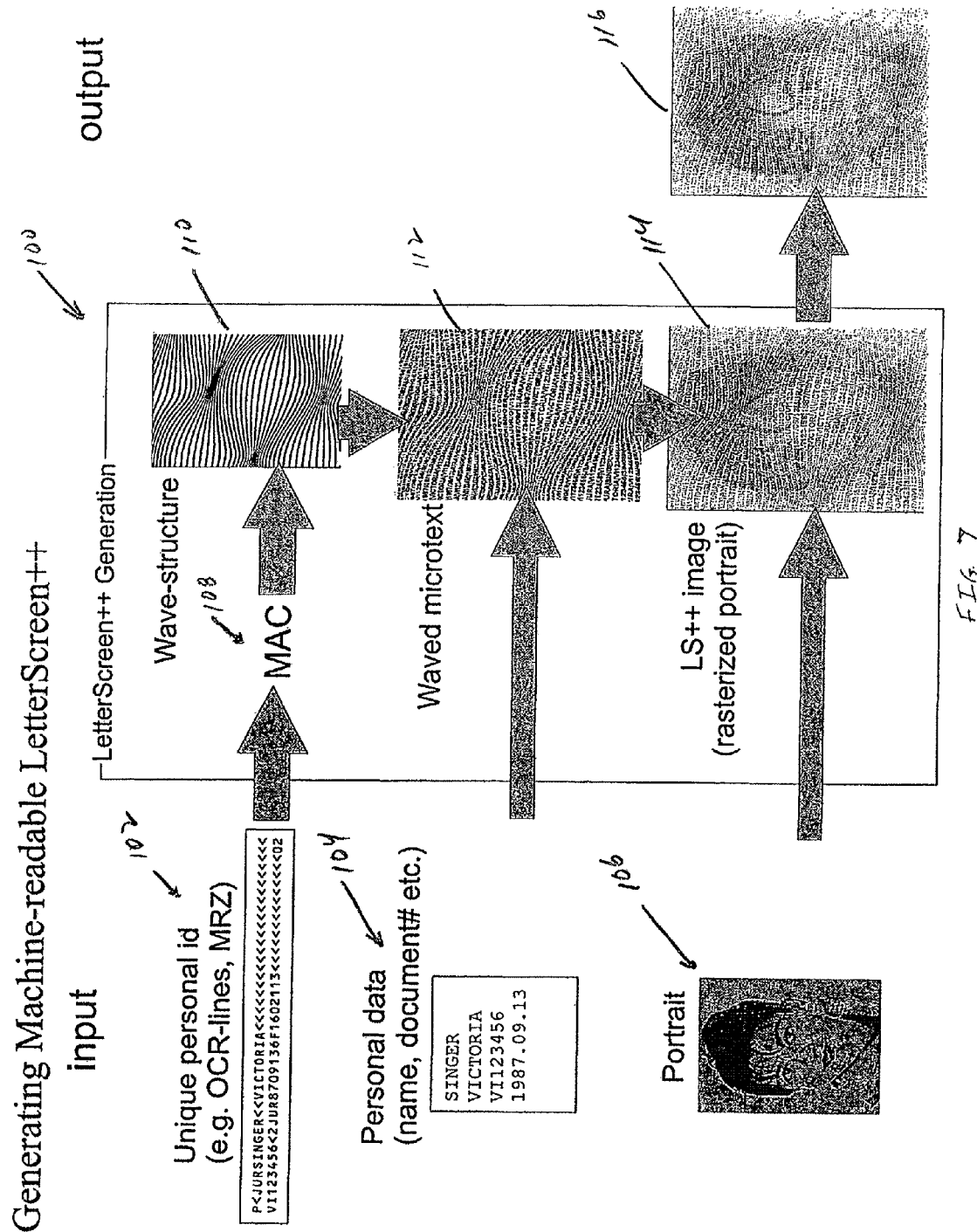
FIG. 7 is a block diagram illustrating generation of machine readable LetterScreen++ in accordance with an exemplary embodiment of the present invention.
Figure 9:
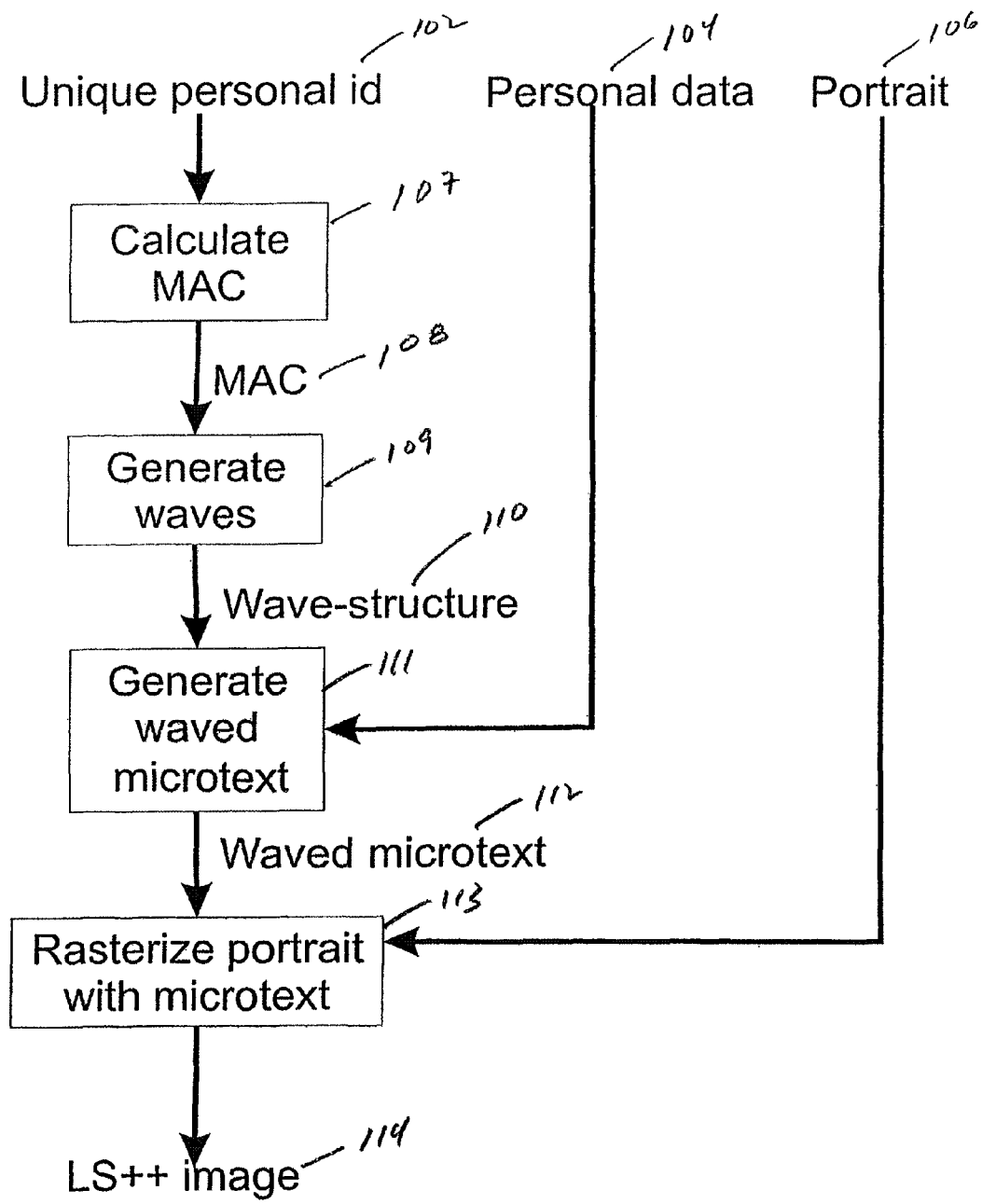
FIG. 9 is a flow chart illustrating generation of a machine readable LetterScreen++ image in accordance with an exemplary embodiment of the present invention.
Figure 11:
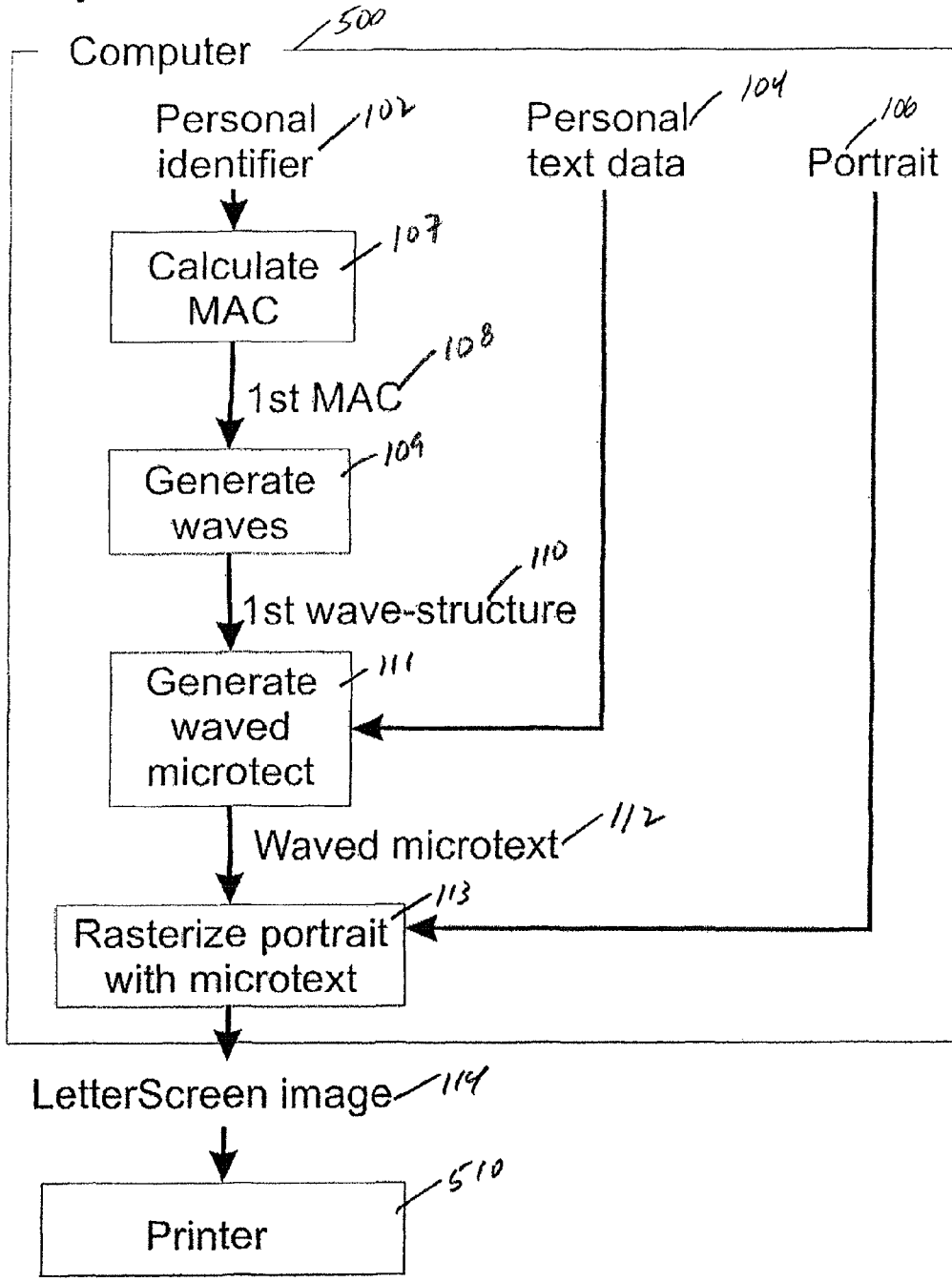
FIG. 11 is a block diagram of a system for generation of a machine readable LetterScreen++ image in accordance with an exemplary embodiment of the present invention.

FIGS. 7 and 9 are a block diagram and flowchart, respectively, illustrating generation 100 of a machine readable LetterScreen++ in accordance with an exemplary embodiment of the present invention. FIG. 11 is a block diagram of the generation system. The inputs are the unique personal identification 102, personal data 104, and an image (portrait) 106 of the individual associated with the Unique ID 102 and personal data 104. The inputs may be provided by way of well-known standard input devices, such a keyboard, optical character recognition (OCR), electronic interfaces, network connections, etc. into a processor device 500 (see FIG. 11) which will store the data in order to transform the image or portrait 106 into a linescreen++ image for output to a display and/or a printer 510. It is contemplated that processor 500 may be a local computer, such as a PC, a processor, or remote server specifically programmed to process the data and image to generate and output the transformed linescreen++ image. As defined herein, a PC is either a Microsoft based machine, an Apple OS based machine, a UNIX based machine or any other type of device that has one or more microprocessors that operates on the data.

In the present example, the ICAO standard OCR lines (from the Machine Readable Zone (MRZ)) are used for the unique personal identification 102. Name, document number, nationality, date of birth, sex, passport expiration date and personal identity number, etc. may be used for the personal data 104. It should be noted that some of this data may be redundant with that of the unique personal identification 102. A jpeg format may be used form image 106, for example.

A first Message Authentication Code (MAC) 108 is generated at step 107 by the processor based on the unique personal ID 102. A first wave structure 110 is generated at step 109 by the processor based on the first MAC 108.

FIGS. 3A-B illustrates the transformation of the microtext structure defined as:

$$x'y'=f(x,y,a,b,c,d)$$

where X represents the horizontal axis, Y is the vertical axis. MAC is abcd:

$$x'=x+a*\sin(x)+b*\sin(y)$$

$$y'=y+c*\sin(x)+d*\sin(y).$$

FIG. 4A is the transformed wave-structure.

The transformed structure is not necessary a wave-structure.

FIG. 4B shows the result of these functions:

$$x'=a+b*x*y$$

$$y'=c+d*x$$

FIG. 4C shows the result of these functions:

$$x'=a+b*x+y$$

$$y'=c*x*x+d*y$$

A waved microtext structure 112 is generated at step 111 by the processor based on the personal data 104 and the first wave structure 110. The processor then uses the input image 106 and the wave microtext structure 112 to generate at step 113 a LetterScreen image 114. The LetterScreen image 114 is then output by the processor for display on a display device and/or printing on a printer 510 (see FIG. 11) onto a passport, for example. Although a passport is discussed herein with respect to the explanation of this aspect of the present invention, the invention is not so limited. For example, this process may be found useful as application to one of more of a check, currency, a ticket, a banknote, a credit card, a visa, a photo-identification card, a special event ticket, a stock/bond certificate, a bank check, a traveler's check, an anti-counterfeiting label, a tax/postage stamp, a birth/death/marriage certificate, a vehicle/property registration card, a deed, and a certificate of title.

Because the wave-structure is calculated by an unique individual property, each structure is therefore unique and thus more robust with respect to efforts to counterfeiting and identity theft. This has significant importance especially today due to ever increasing efforts in national security.

Figure 8:
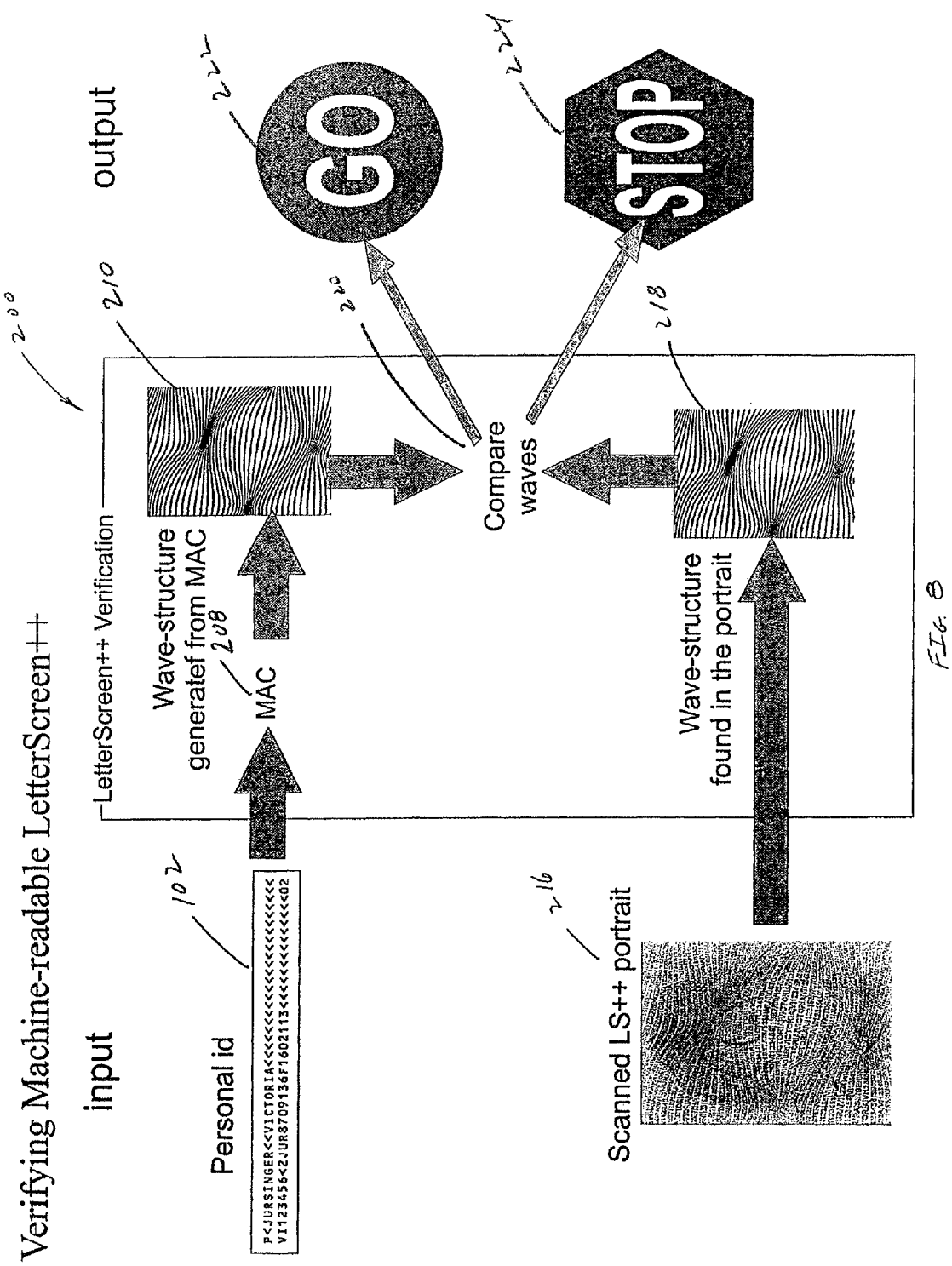
FIG. 8 is a block diagram illustrating verification of machine readable LetterScreen++ in accordance with an exemplary embodiment of the present invention.
Figure 10:
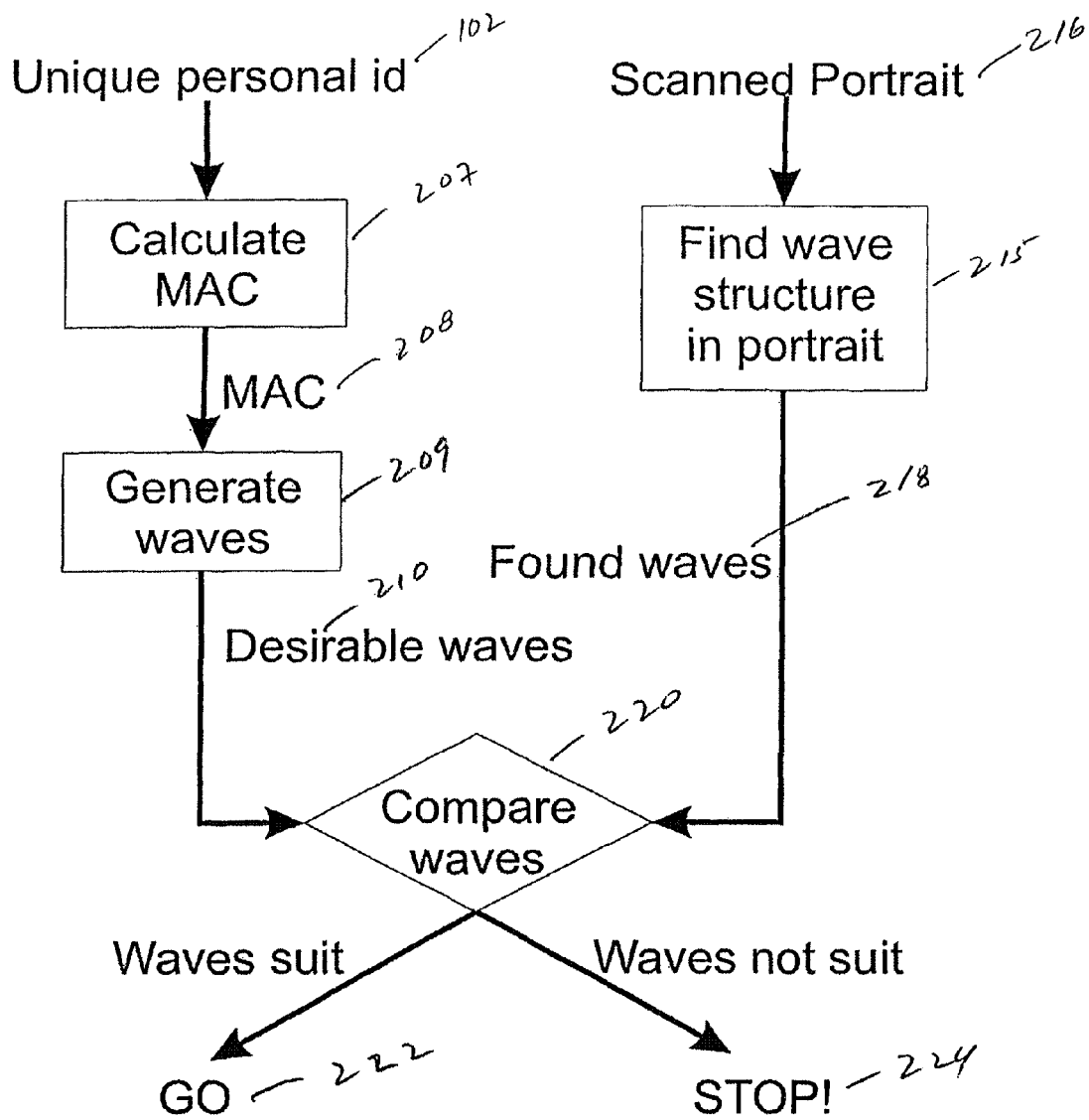
FIG. 10 is a flow chart illustrating verification of a machine readable LetterScreen++ image in accordance with an exemplary embodiment of the present invention.
Figure 12:
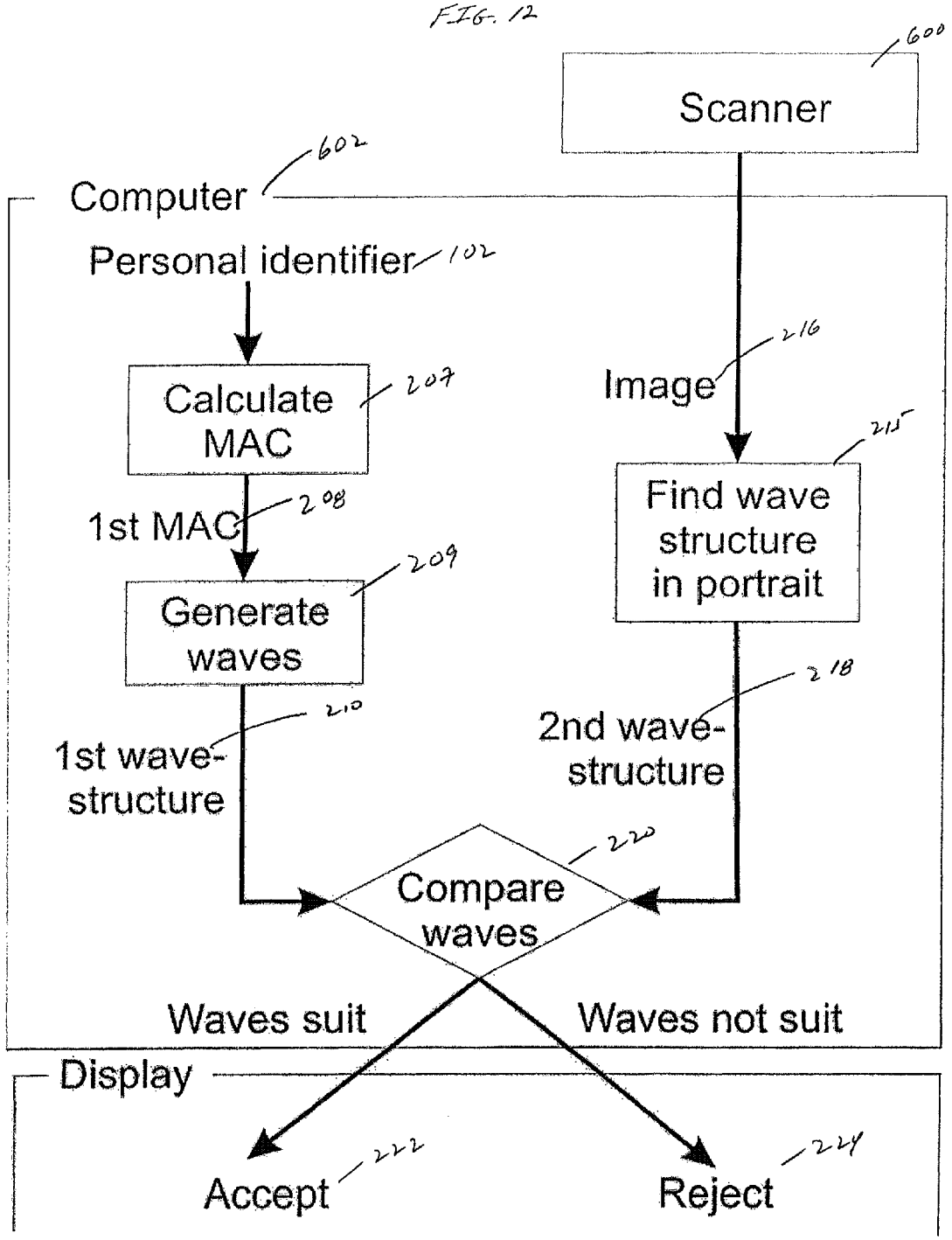
FIG. 12 is a block diagram of a system for verification of a machine readable LetterScreen++ image in accordance with an exemplary embodiment of the present invention.

In comparison to the prior art methods, the position of lines are modified, resulting in wavy lines of slightly changed text size. Accordingly, the method is suitable not only for microtext-characters, but also for any kind of raster, able to modify not only the position, but the shape, color or any other property of the raster. In the case of a microtext-screen even the individual characters can be identified FIGS. 8 and 10 are a block diagram and flowchart, respectively, illustrating verification of machine readable LetterScreen++ in accordance with an exemplary embodiment of the present invention. FIG. 12 is a block diagram of the verification system. The Personal ID 102 of the individual presenting his or her passport for authentication is input into a document reader 602 (see FIG. 12). The individual's passport (image 216) is also input into document reader 602. Document reader 602 may be a scanner, for example. The document reader 602 generates a first MAC 208 at step 207 based on the personal identifier 102. The document reader 602 then generates a first wave structure 210 at step 209 based on the MAC 208.

As defined herein, a document reader may be a personal information manager (PIM), a smartphone, a laptop computer, a nettop computer, a netbook computer, a tablet computer or a dedicated authentication device.

At step 215 the document reader finds the wave structure 218 in the scanned image 216, and then at step 220 compares the second wave structure 218 to the wave structure 210. If the comparison determines that wave structure 218 matches wave structure 210 an output 222 is generated advising that the passport (image 216) is authentic and thus acceptable. Otherwise an output 220 is generated advising that the passport (image 216) is not authentic and should be rejected.

The aforementioned system and method provides advantages heretofore unrealized. Among these are:
does not require high resolution scanning facilities, therefore authentication can be quick using commonly used devices (such as PIM, a smartphone, a laptop computer, a nettop computer, a netbook computer, a tablet computer or a dedicated authenticator device),
the machinery itself can decide that the image belongs to the document, take over the decision from the control person,
rapid control, and
reliable control.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for generating a document for use with a personal identifier, personal data and an image, the method comprising:
   inputting the personal identifier into a processor, the personal identifier including alphanumerical characters identifying a user;
   inputting the personal text data into the processor;
   inputting an image of the user into the processor;
   generating, by the processor, a first Message Authentication Code (MAC) based on the personal identifier;
   generating, by the processor, a periodic wave structure based on the MAC, the periodic wave structure is an image of periodic wavy lines which are each positioned based on the MAC, the periodic wave structure is defined as: $x'y'=f(x,y,a,b,c,d)$, where:
   a is a first portion of the MAC,
   b is a second portion of the MAC,
   c is a third portion of the MAC,
   d is a remaining portion of the MAC,
   x includes a plurality of different horizontal axis coordinates in the image,
   y includes a plurality of different vertical axis coordinates in the image,
   x' are horizontal axis coordinates of the wavy lines, y' are vertical axis coordinates of the wavy lines, and
f is a periodic function;

generating, by the processor, a periodic waved microtext by replacing the periodic wavy lines at the x' and y' coordinates of the periodic wave structure with alphanumerical characters of personal text data of the user;

generating, by the processor, a letter screen image from the input image with the periodic waved microtext, by recreating the image of the user by altering selected portions of the periodic waved microtext at the x' and y' coordinates; and outputting the letter screen image.

2. The method of claim 1 wherein the wave structure is based on one of i) a round screen, ii) a line screen, iii) an elliptical screen, iv) a rotogravure screen, v) a stochastic screen, vi) a geometric screen, vii) a continuous tone screen, and viii) a programmable screen.

3. The method of claim 1, wherein the personal identifier is Machine Readable Zone (MRZ) information including name, passport number, nationality, date of birth, sex, passport expiration date and personal identity number.

4. The method of claim 3 wherein the personal identifier is based on an RFID, a digital signature, a fingerprint, or a social security number.

5. The method of claim 1, further comprising printing the output image onto a document for authentication.

6. The method of claim 5, wherein the document for authentication is a passport.

7. The method of claim 5, wherein the document is at least one of: a check, currency, a ticket, a banknote, a credit card, a visa, a photo-identification card, a special event ticket, a stock/bond certificate, a bank check, a traveler's check, an anti-counterfeiting label, a tax/postage stamp, a birth/death/marriage certificate, a vehicle/property registration card, a deed, and a certificate of title.

8. The method of claim 1, further comprising:
inputting the personal identifier into a document reader;
generating, by the document reader, a second Message Authentication Code (MAC) based on the personal identifier;
generating, by the document reader, a second wave structure based on the MAC, the wave structure is defined as: x'y'+f(x, y, a, b, c, d), where
a is a first portion of the MAC,
b is a second portion of the MAC,
c is a third portion of the MAC,
d is a remaining portion of the MAC
scanning the output image by the document reader;
determining the first wave structure from the scanned output image;
comparing the first wave structure to the second wave structure;
generating an output signal based on the comparison.

9. The method of claim 8, wherein the output signal indicates:
i) approval of the scanned output image if the first wave structure matches the second wave structure; or
ii) rejection of the scanned output image if the first wave structure is different than the second wave structure.

10. The method of claim 8 wherein the document authentication is performed by a PIM, a smartphone, a laptop computer, a nettop computer, a netbook computer, a tablet computer or a dedicated authentication device.

11. The method of claim 1, wherein the personal identifier is input into the at least one of the processor or the document reader based on optical character recognition.

12. A device for authenticating an output image generated by the method of claim 1, the device comprising:
means for inputting the personal identifier;
means for generating a second Message Authentication Code (MAC) based on the personal identifier;
means for generating a second wave structure based on the MAC;
means for scanning the output image;
means for determining the first wave structure from the scanned output image;
means for comparing the first wave structure to the second wave structure;
means for generating an output signal based on the comparison.

13. A method for document authentication for use with the document generated in accordance with the method of claim 1 comprising:
inputting the personal identifier into a document reader;
generating, by the document reader, a second Message Authentication Code (MAC) based on the personal identifier;
generating, by the document reader, a second wave structure based on the MAC;
scanning the output image by the document reader;
determining the first wave structure from the scanned output image;
comparing the first wave structure to the second wave structure;
generating an output signal based on the comparison.

14. The method of claim 13, wherein the output signal indicates:
i) approval of the scanned output image if the first wave structure matches the second wave structure; or
ii) rejection of the scanned output image if the first wave structure is different than the second wave structure.

15. The method of claim 1 wherein the wave structure is a sinus wave, where $$x'=x+a*\sin(x)+b*\sin(y)$$

$$y'=y+c*\sin(x)+d*\sin(y),$$

wherein x is the horizontal axis coordinate and y is the vertical axis coordinate.

16. The method of claim 1 wherein, a, b, c and d are equal length portions of the MAC.

17. A system for generating a document for use with a personal identifier, personal data and an image, the system comprising:
means for inputting the personal identifier, the personal identifier including alphanumerical characters identifying a user;
means for inputting the personal text data;
means for inputting an image of the user;
means for generating a first Message Authentication Code (MAC) based on the personal identifier;
means for generating a first periodic wave structure based on the MAC, the wave periodic structure is an image of periodic wavy lines which are each positioned based on the MAC, the periodic wave structure is defined as: x'y'=f(x,y,a,b,c,d), where:
a is a first portion of the MAC,
b is a second portion of the MAC,
c is a third portion of the MAC,
d is a remaining portion of the MAC,
x includes a plurality of different horizontal axis coordinates in the image, y includes a plurality of different vertical axis coordinates in the image, x' are horizontal axis coordinates of the wavy lines, y' are vertical axis coordinates of the wavy lines, and f is a periodic function;

means for generating a periodic waved microtext by replacing the periodic wavy lines at the x' and y' coordinates of the periodic wave structure with alphanumerical characters of personal text data of the user;

means for generating a letter screen image from the input image, by recreating the image of the user by altering selected portions of the periodic waved microtext at the x' and y' coordinates; and means for rasterizing the letter screen with the periodic waved microtext to generate an output image.

18. A system for generating a document for use with a personal identifier, personal data and an image, the system comprising:

a processor device;

an input device coupled to the processor; and an output device coupled to the processor;

the input device inputting the personal identifier including alphanumerical characters of a user, the personal text data, and an image of the user into the processor;

the processor configured to:
  i) generate a first Message Authentication Code (MAC) based on the personal identifier,
  ii) generate a first non-periodic structure based on the MAC, the non-periodic structure is an image of non-periodic lines which are each positioned based on the MAC, the non-periodic structure is defined as: x'y'=f(x,y,a,b,c,d), where:
    a is a first portion of the MAC,
    b is a second portion of the MAC,
    c is a third portion of the MAC,
    d is a remaining portion of the MAC,
    x includes a plurality of different horizontal axis coordinates in the image,
    y includes a plurality of different vertical axis coordinates in the image,
    x' are horizontal axis coordinates of the lines,
    y' are vertical axis coordinates of the lines, and
    f is a non-periodic function;
  iii) generate a non-periodic microtext by replacing the non-periodic lines at the x' and y' coordinates of the non-periodic structure with the alphanumerical characters of personal text data of the user;
  iv) generate a letter screen image from the input image, by recreating the image of the user by altering selected portions of the non-periodic microtext at the x' and y' coordinates; and
  v) output a rasterized output image comprising the letter screen and the non-periodic microtext to the output device.

19. The system of claim 18, wherein the output device is at least one of a display and a printer.

20. A method for generating a document for use with a personal identifier, personal data and an image, the method comprising:

inputting the personal identifier into a processor, the personal identifier including alphanumerical characters identifying a user;

inputting the personal text data into the processor;

inputting an image of the user into the processor;

generating, by the processor, a first Message Authentication Code (MAC) based on the personal identifier;

generating, by the processor, a non-periodic structure based on the MAC, the non-periodic structure is an image of non-periodic lines which are each positioned based on the MAC, the non-periodic structure is defined as: x'y'=f(x,y,a,b,c,d), where:
  a is a first portion of the MAC,
  b is a second portion of the MAC,
  c is a third portion of the MAC,
  d is a remaining portion of the MAC,
  x includes a plurality of different horizontal axis coordinates in the image,
  y includes a plurality of different vertical axis coordinates in the image,
  x' are horizontal axis coordinates of the lines, and
  y' are vertical axis coordinates of the lines,
  f is a non-periodic function;

generating, by the processor, a non-periodic microtext by replacing the non-periodic lines at the x' and y' coordinates of the non-periodic structure with alphanumerical characters of personal text data of the user;

generating, by the processor, a letter screen image from the input image with the non-periodic microtext, by recreating the image of the user by altering selected portions of the non-periodic microtext at the x' and y' coordinates; and outputting the letter screen image.

* * * * *